No. 888,353. PATENTED MAY 19, 1908.
R. ROBINSON.
CORN HARVESTER.
APPLICATION FILED DEC. 8, 1906.

5 SHEETS—SHEET 3.

No. 888,353. PATENTED MAY 19, 1908.
R. ROBINSON.
CORN HARVESTER.
APPLICATION FILED DEC. 8, 1906.

5 SHEETS—SHEET 4.

Inventor
Ray Robinson,
By Victor J. Evans
Attorney

Witnesses

No. 888,353. PATENTED MAY 19, 1908.
R. ROBINSON.
CORN HARVESTER.
APPLICATION FILED DEC. 8, 1906.
5 SHEETS—SHEET 5.
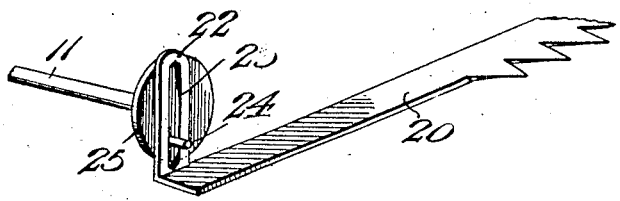
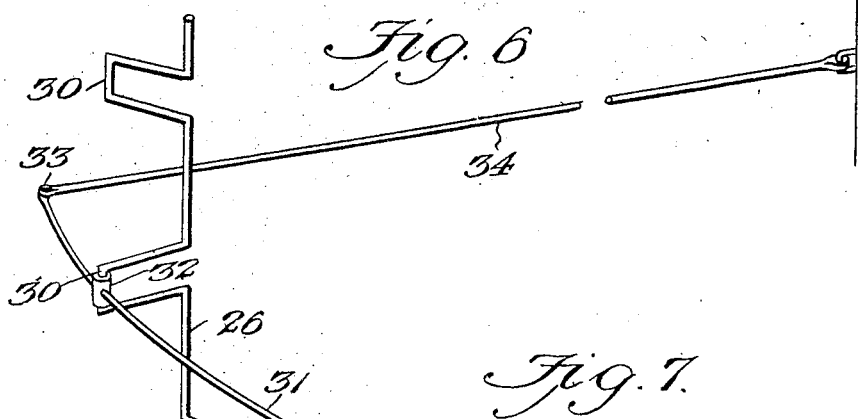
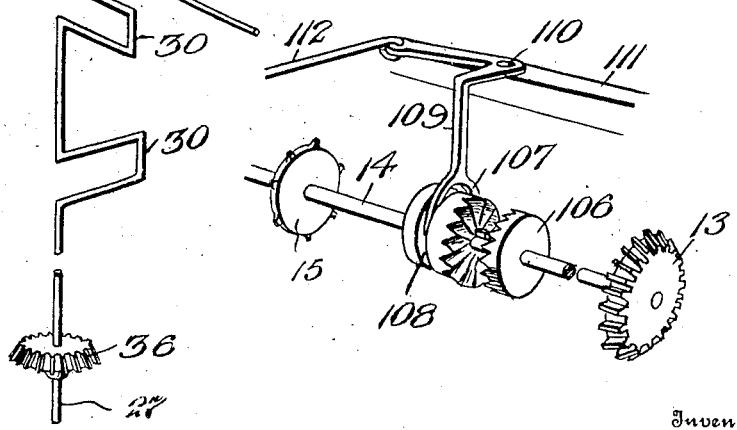
Witnesses
Inventor
Ray Robinson,
By Victor J. Evans
Attorney

UNITED STATES PATENT OFFICE.

RAY ROBINSON, OF WAKEFIELD, NEBRASKA, ASSIGNOR OF ONE-HALF TO HARRY ROBINSON, OF WAKEFIELD, NEBRASKA.

CORN-HARVESTER.

No. 888,353.  Specification of Letters Patent.  Patented May 19, 1908.

Application filed December 8, 1906. Serial No. 346,909.

*To all whom it may concern:*

Be it known that I, RAY ROBINSON, a citizen of the United States of America, residing at Wakefield, in the county of Dixon and State of Nebraska, have invented new and useful Improvements in Corn-Harvesters, of which the following is a specification.

This invention relates to corn harvesters, and one of the principal objects of the invention is to provide means for cutting the stalks, snapping the ears from the stalks, husking the ears, and shredding the stalks to form fodder, these operations being carried on continuously as the machine travels over the field.

Another object of my invention is to provide novel means for gathering the stalks and laying them with the tops upward upon a traveling belt which conveys them back to the snapping rolls into the cutter mechanism.

Still another object is to provide a series of reel arms for engaging the stalks as they are led between the divider boards and carry said stalks backward to the operative mechanism, and to provide endless conveyers for carrying the shredded stalks and the husked corn out at the side of the machine.

Figure 1:
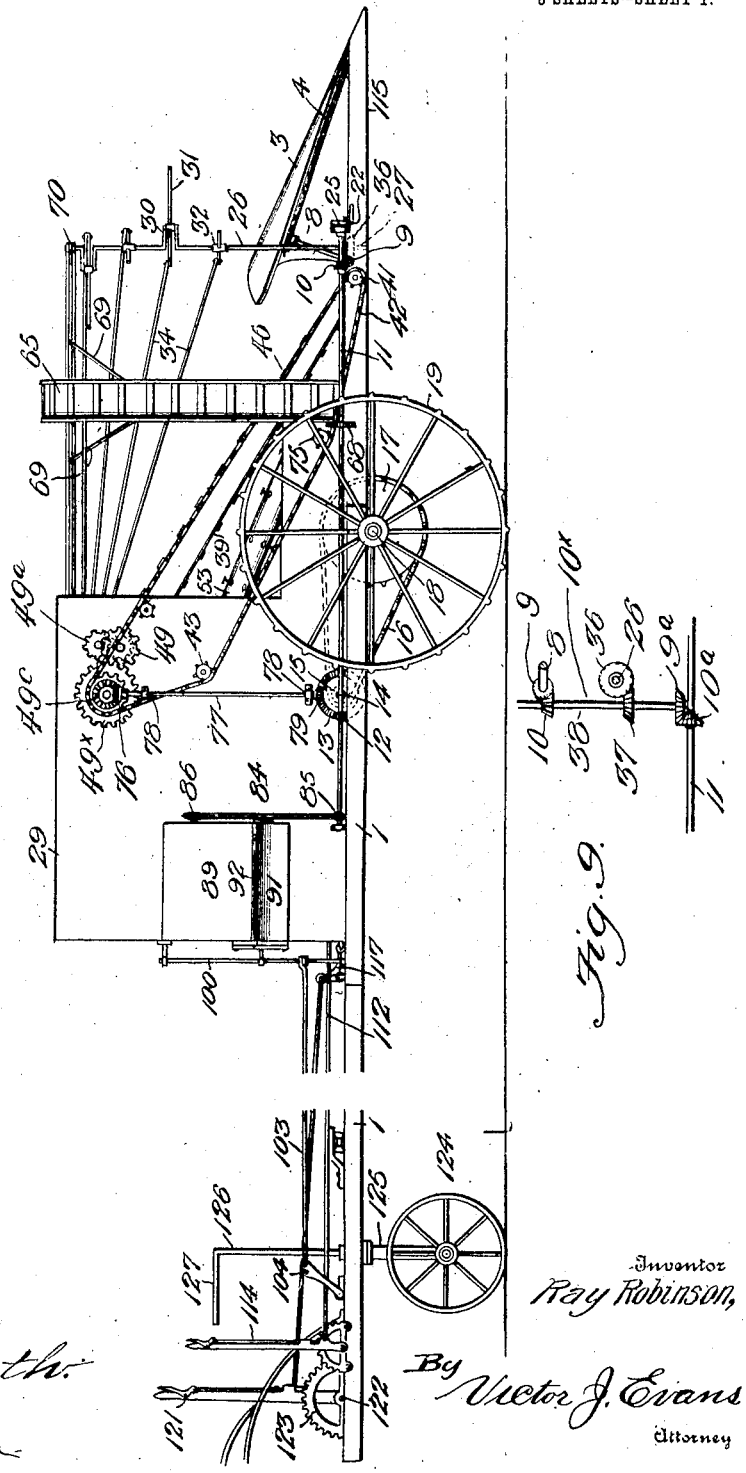
Figure 2:
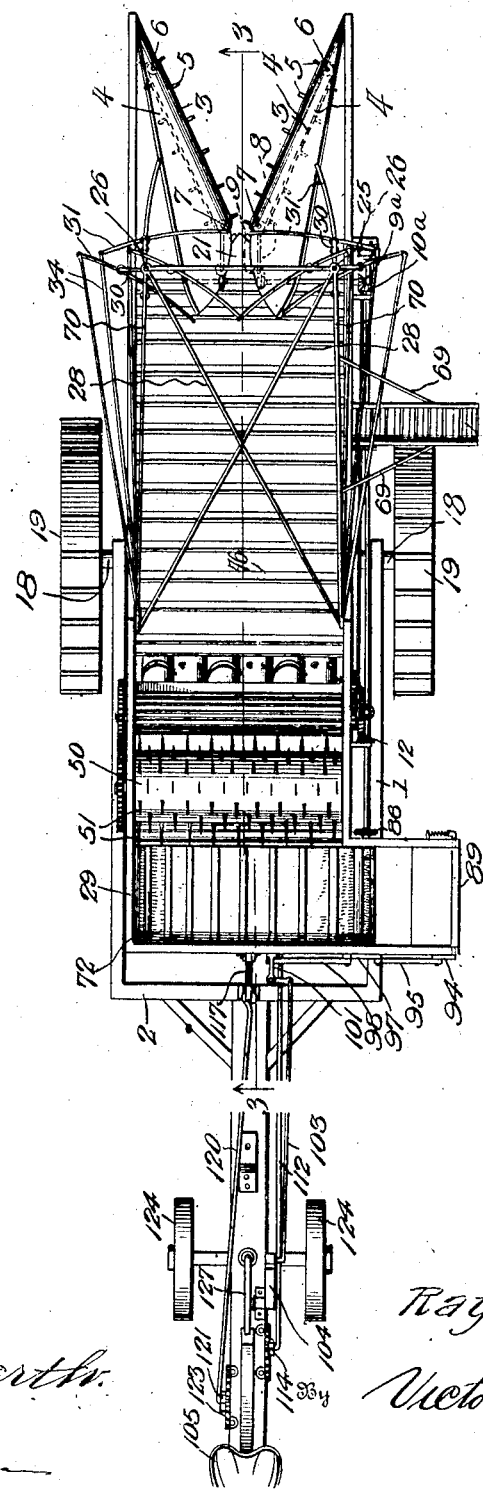
Figure 3:
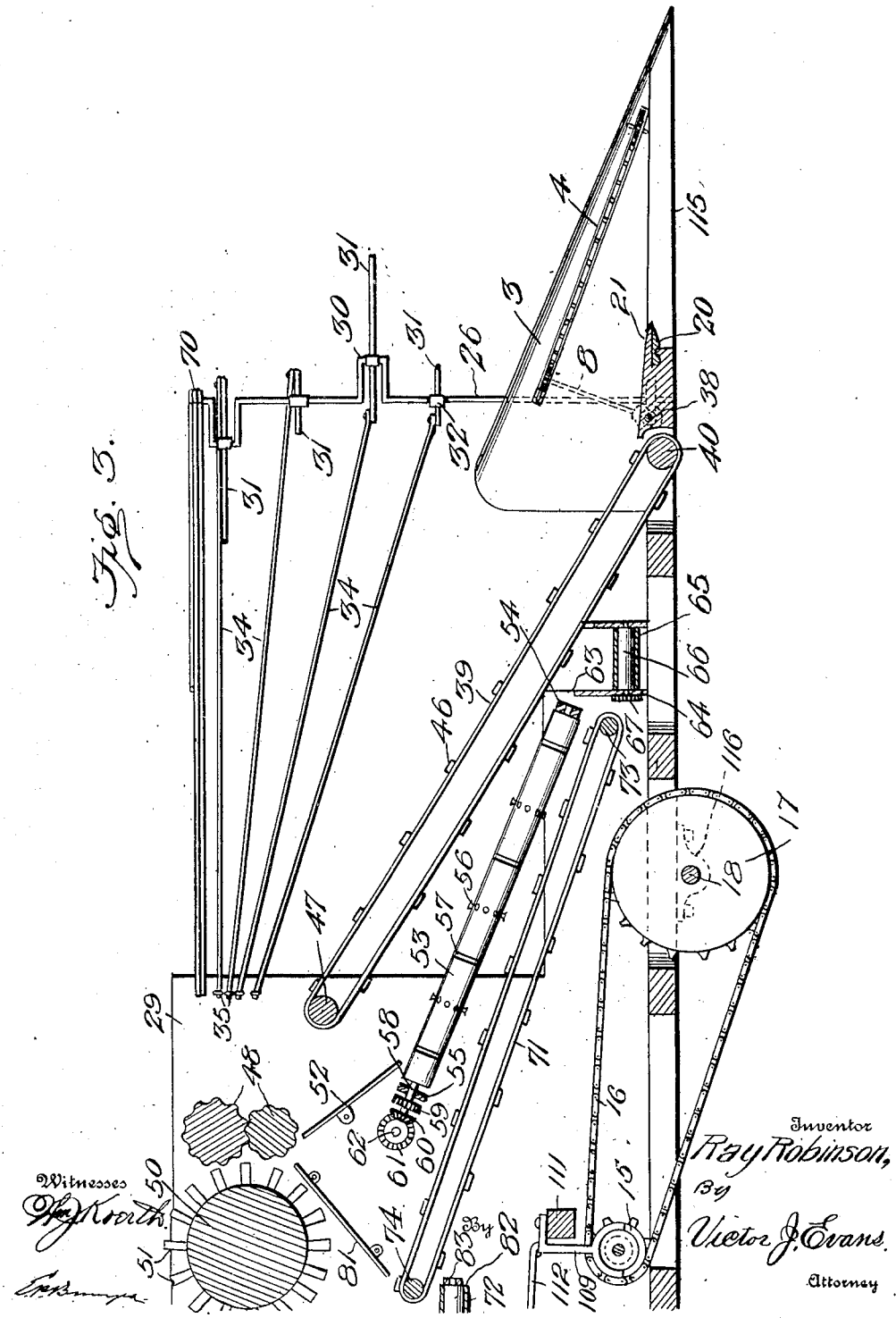
Figure 4:
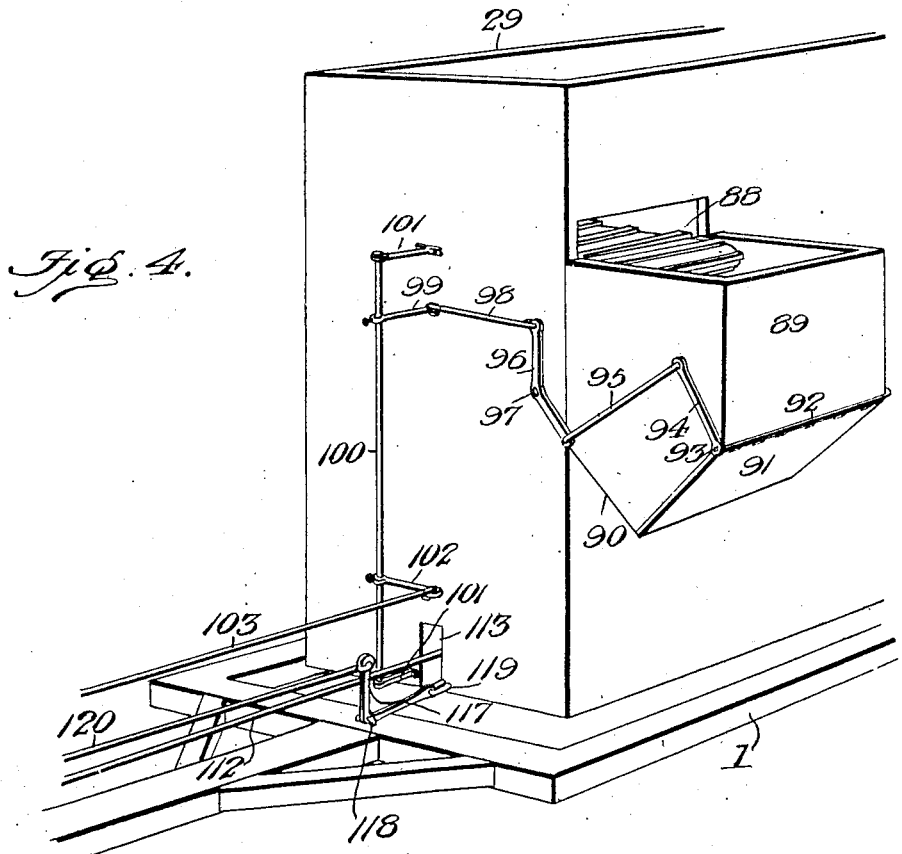
Figure 8:
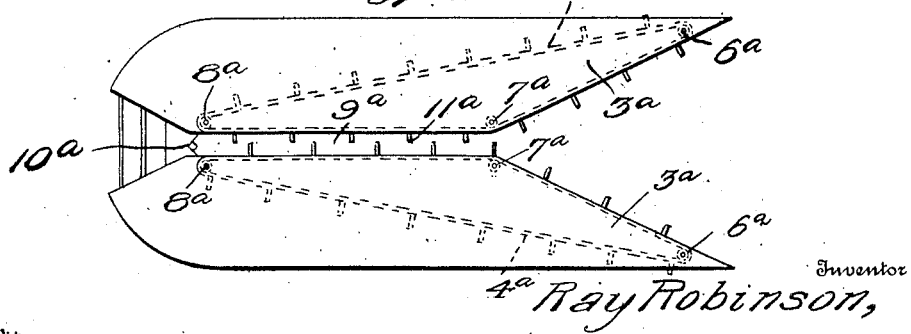

These and other objects may be attained by means of the construction illustrated in the accompanying drawings, in which:

Figure 1 is a side elevation of a machine made in accordance with my invention. Fig. 2 is a plan view of the same. Fig. 3 is a longitudinal section on the line 3—3, Fig. 2, looking in the direction indicated by the arrow. Fig. 4 is a perspective view of a discharge hopper for the shredded stalks. Fig. 5 is a detail perspective view of one end of the cutter bar for severing the stalks, and showing the means for reciprocating said bar. Fig. 6 is a perspective view, showing one of the reel arms and the means for actuating the same. Fig. 7 is a detail perspective view of the clutch for throwing the mechanism into and out of operation. Fig. 8 is a plan view of a modified form of divider board and arrangement of gathering chains. Fig. 9 is a detail plan view of the shafts and gearing for operating the cutter bar and the reel arms. Fig. 10 is a detail perspective view of a pivoted frame upon which the mechanism is mounted.

Referring to the drawings for a more particular description of my invention, the numeral 1 designates the frame work of the machine comprising longitudinal side bars, and a rear cross bar 2. Mounted upon the front end of the side bars are the oppositely disposed divider boards or gathering arms 3, said divider boards being curved upwardly and backwardly, as shown in Figs. 1, 2 and 3. Gathering chains 4, the links of which are provided with outwardly extending fingers 5, pass around sprocket wheels 6, 7 journaled under the dividing boards, the sprocket wheel 7 being mounted upon an inclined shaft 8 which carries at its lower end a bevel gear 9 which meshes with a similar gear 10 on a transverse shaft 10$^\times$ having at its outer end a bevel gear 9$^a$ which meshes with a gear 10$^a$ on a longitudinally disposed shaft 11. The shaft 11 is provided with a bevel pinion 12 which engages a bevel gear 13 mounted upon a transverse shaft 14 carrying a sprocket wheel 15 which is engaged by a sprocket chain 16 passing around a sprocket wheel 17 on the axle 18 of the ground wheels 19. A reciprocating cutter bar 20 of the usual or any preferred construction extends transversely of the frame underneath the divider board 3, said cutter bar adapted to be reciprocated between finger plates 21 supported upon the frame by means of a vertical lug 22 provided with a slot 23 engaged by a pin 24 upon a disk 25 carried upon the end of shaft 11, as shown more particularly in Fig. 5.

As shown in Fig. 8, the divider boards 3$^a$ extend backward further than those shown in the other views, and the gathering chains 4 are mounted upon sprocket wheels 6$^a$, 7$^a$ and 8$^a$ to provide a leading channel 9$^a$, between which the stalks are led backward to the cutter 10$^a$, the fingers 11$^a$ projecting from the gathering chains being disposed alternately in the leading channel 9$^a$, as shown in said figure.

The gathering reels are mounted upon vertically disposed cranked shafts 26 journaled at their lower ends 27 in the side bars of the frame, and their upper ends being braced by cross braces 28 secured at their rear ends to a housing 29 for the husking and shredding mechanism. The shafts 26 are each provided with cranked portions 30 disposed at four equidistant points projecting outward from said shaft in directions at right angles one to the other, alternately, as shown more particularly in Fig. 6. Gathering arms 31 comprising curved rods are mounted in sleeves 32, and said sleeves are journaled upon the cranked portions 30 of the shafts, 26, the outer ends of said gathering arms 31 being pivoted at 33 to backwardly extending connecting rods 34, the rear ends of which are pivoally connected by staples or similar fastenings 35 to the housing 29, so that the rods 34 may move laterally. The lower ends of the shafts 26 are provided with beveled pinions 36 which mesh with similar gears 37 on a transverse shaft 38 journaled in the side bars of the frame. An endless belt or conveyer 39 passes around a roller 40 at its lower end, said roller being journaled in the side bars of the frame, and provided with a sprocket wheel 41 at one end of said roller engaged by a chain 42 which passes around sprocket wheels 34, 44 75 and 45 mounted upon shafts journaled in the housing 29. The endless belt 39 is provided with slats 46 and the upper end of said belt passes around a roller 47 journaled in the housing 29, said roller 47 carrying the sprocket wheel 45 mounted upon its shaft outside the housing 29, as shown more particularly in Fig. 1. Snapping rollers 48, which are shown as being longitudinally corrugated, are journaled at their opposite ends in the housing 29, and the shafts of said rollers are provided with gear wheels 49 which mesh with each other on the outside of the housing 29. A shredding roller 50, provided with a series of radially arranged knives 51, is journaled in the housing 29 back of the snapping rollers 48. An inclined guide board 52 extends across and under the snapping rolls 48 to deposit the ears of corn upon the husking rollers 53, disposed in series extending across the frame. The lower ends of the husking rolls 53 are journaled in a bracket 54 secured at its ends to the inner walls of the housing 29, and the upper ends of said rolls are journaled in a similar bracket 55, secured in a like manner to the inner walls of said housing. The husking rolls are provided with radial husking fingers 56, and intermediate grooves 57, and at the upper ends of said rollers, the shafts 58 are each provided with a gear wheel 59 which meshes with a similar gear upon the next adjacent snapping roll, and so on throughout the series. Upon the upper ends of the shafts 58 bevel gears 60 mesh with a similar gear 61 mounted on a shaft 62 journaled in the walls of the housing 29. These husking rolls are disposed in an inclined direction and at their lower ends the husked ears are discharged through an opening 63 in a chute 64 extending across the front of the housing, and mounted in said chute is an endless slatted belt 65 which extends in an inclined direction up and out at the top of the machine for discharging the ears into a wagon driven at the side of the machine. The belt 65 is driven by a roller 66 mounted in the walls of the chute 64 and provided at one end with a gear wheel 67 which meshes with a gear wheel 68 on the shaft 11. The upper end of the belt 65 passes around a roller supported by brackets 69 connected at their inner ends to longitudinal braces 70 provided at their front ends with journal bearings for the shafts 26, and their rear ends being secured to the walls of the housing 29.

Mounted underneath the husking rolls 53 is an endless slatted belt 71 designed for carrying the husks upward and backward to deposit them upon a transverse belt 72, said belt 71 being mounted at its lower end upon a roller 73 journaled in the front portion of the housing 29 and the upper end of said belt passing around a roller 74, also journaled in the housing 29. The belt 71 is moved upwardly by means of a sprocket wheel 75 mounted on the end of the roller 40 at one side of the housing 29, said sprocket wheel being engaged by the chain 42. The shredding roller 50 is rotated by means of a bevel pinion 76 mounted upon the upper end of a vertical shaft 77, journaled in keepers 78. At one side of the housing 29, the lower end of said shaft 77 carries a pinion 79 which meshes with the bevel gear 13. The gear wheel 49 on the end of the lower snapping roll shaft meshes with the gear wheel 49$^\times$ on the end of the shredder shaft, and a gear wheel on the lower snapping roll shaft (shown in dotted lines in Fig. 1) meshes with the gear wheel 49$^a$ on the shaft of the upper snapping roll. The bevel pinion 76 on shaft 77 meshes with a bevel pinion 49$^c$ on the outer end of the shredder shaft. Underneath the shredding roll 50 is an inclined guide board 81 which discharges the shredded stalks upon the endless belt 72. The belt 72 is mounted to move upon a roller 82 journaled in a bracket 83 extending across between the two walls of the housing 29, and said roller being journaled at its opposite end in the rear wall of the housing. The roller 82 is rotated by a chain 84 leading from a sprocket wheel 85 on the shaft 11 to a sprocket wheel 86 on the end of the upper roller 87 for said belt.

Upon one side of the housing 29 is an opening 88 through which the upper end of the belt 72 discharges the shredded stalks and the husks into a hopper 89 having an outwardly inclined bottom 90, and a hinged door 91 being hinged upon a rod 92 having a squared end 93 to which is connected a link 94, said link having a connecting rod 95 attached thereto, the opposite end of said rod being connected to a bell crank lever 96, pivoted at 97, to the rear wall of the housing 29. The bell crank lever 96 has connected to its upper arm a rod 98 attached to a lever 99 adjustably mounted upon a vertical shaft 100 journaled in brackets 101 extending outward from the rear wall of said housing. Connected to the shaft 100 is an arm 102 and an operating wire 103 extends from said arm backward to a foot lever 104 located in front of the driver's seat 105, the purpose of this mechanism being to discharge the contents of the hopper 89. whenever required by the movement of the foot lever 104 and its connections to the door 91.

A clutch mounted on the shaft 14 is designed for throwing into and out of operation the various mechanisms. The clutch consists of a stationary member 106 and a sliding member 107, said sliding member having a groove 108 therein engaged by a bifurcated bell crank lever 109 pivoted at 110 to a cross bar 111 extending from one wall to the other of the housing 29. A connecting rod 112 extends backward through an opening 113 in the rear wall of the housing to a lever 114 pivoted on the frame of the machine within reach of the driver sitting upon the seat 105.

The housing containing the operative mechanism and the divider boards 3 are connected to a pivoted frame 115 mounted upon the axle 18 by means of bearings 116. To tilt this frame and thus adjust the divider boards toward and from the ground, a bell crank lever 117 is pivoted at 118 to the stationary frame 1, and connected by a staple 119 to the rear wall of the housing. The opposite arm of the lever 117 is connected by a rod or wire 120 to a lever 121 pivoted at 122 to the stationary frame 1 and provided with a sector rack 123. This end of the frame is mounted upon ground wheels 124, and the axle of said wheels is pivotally supported upon a sleeve 125 through which a crank handle 126 extends, said crank handle terminating in a suitable handle 127 for moving said axle upon its pivotal point to guide the machine.

The operation of my invention may be briefly described as follows: The machine is pushed over the field by means of draft animals attached at opposite sides of the machine in the rear thereof, and the divider boards extend upon opposite sides of a row of corn and lead the stalks up to the cutter bar 20, while the reel arms 31 engage the stalks as they rotate inwardly and deposit the stalks upon the conveyer 39 with the tops or heads of the stalks disposed upwardly. The snapping rolls 48 engage the stalks and as they pass between said rolls, the ears of corn are snapped off the stalks and they fall upon the guide board 52 from which they are discharged upon the husking rolls 53. The husks are drawn through between the rollers and drop upon the endless belt 71 which conveys the husks upwardly and deposits them upon the transverse belt 72, the husked ears being discharged from the lower ends of the rolls 53 through the opening 63 onto the belt 65 which carries them upward and discharges them into a wagon at the side of the machine. The stalks being carried between the snapping rolls 48 are presented to the shredding roller 50 which cuts the stalks into shreds and deposits the material upon the belt 72 which conveys the same through the hopper 89 from which they are discharged at intervals through the door 91 by means of the foot lever 104 actuated by the driver. The frame upon which the housing and the divider boards are supported is tilted by means of the lever 121 to move the divider boards toward and from the ground, while the machine is guided in its movements by means of the crank handle 127.

From the foregoing it will be understood that a machine constructed in accordance with my invention will cut stalks, carry them up to the snapping rollers, snap off the ears, husk the corn, discharge the husked ears, carry the husks up and deposit them upon an endless conveyer, shred the stalks and discharge them upon the same conveyer, and carry said shredded stalks and husks to a discharge hopper, thus utilizing all parts of the stalk and husk as a fodder, and at the same time delivering the husked ears to a wagon.

Having thus described the invention, what I claim is:

1. In a corn harvesting machine, divider boards, gathering chains, reels located upon opposite sides of said divider boards and comprising vertical shafts having cranked portions extending in four directions outwardly from said shafts, gathering arms pivotally connected to said cranked portions, and connecting rods pivotally connected to said gathering arms at one end, extending rearwardly, and the opposite ends pivoted to the frame of the machine.

2. In a machine of the character described, the combination of divider boards, gathering chains provided with fingers projecting beyond the inner edges of said divider boards, gathering reels comprising vertically disposed crank shafts, curved gathering arms pivoted to the crank portions of said shafts, connecting rods pivotally connected to said gathering arms at one end, said rods being extended rearwardly and their opposite ends pivoted to the frame of the machine, a reciprocating cutter bar disposed under the gathering arms, and an endless conveyer in rear of said cutter bar.

3. In a machine of the character described, the combination of divider boards, gathering chains provided with fingers projecting beyond the inner edges of the divider boards, vertically disposed crank shafts, curved gathering arms mounted to rotate upon said crank shafts, connecting rods pivotally connected to said gathering arms at one end, said rods being extended rearwardly, and their opposite ends pivoted to the frame of the machine, and a reciprocating cutter bar under the gathering arms.

4. In a machine of the character described, divider boards, gathering chains provided with fingers projecting beyond the inner edges of the divider boards, a reciprocating cutter bar, gathering reels comprising vertically disposed crank shafts, curved gathering arms pivoted to said crank shafts, links pivotally connected to said gathering arms and extending backwardly and connected to the frame of the machine.

In testimony whereof, I affix my signature in presence of two witnesses.

RAY ROBINSON.

Witnesses:
 JOHN D. HASKELL,
 Mrs. A. E. REPINE.